(12) United States Patent
Hwang et al.

(10) Patent No.: US 8,542,302 B2
(45) Date of Patent: Sep. 24, 2013

(54) DIGITAL PHOTOGRAPHING APPARATUS, METHOD OF CONTROLLING THE DIGITAL PHOTOGRAPHING APPARATUS, AND RECORDING MEDIUM STORING PROGRAM TO IMPLEMENT THE METHOD

(75) Inventors: Kyu-ern Hwang, Suwon-si (KR); Eun-ho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 585 days.

(21) Appl. No.: 12/708,614

(22) Filed: Feb. 19, 2010

(65) Prior Publication Data

US 2010/0214451 A1   Aug. 26, 2010

(30) Foreign Application Priority Data

Feb. 20, 2009   (KR) .................. 10-2009-0014413

(51) Int. Cl.
*H04N 5/202*   (2006.01)

(52) U.S. Cl.
USPC ........................................ 348/254; 348/345

(58) Field of Classification Search
USPC ................................................. 348/254, 345
See application file for complete search history.

(56) References Cited

U.S. PATENT DOCUMENTS

| | | | |
|---|---|---|---|
| 7,092,625 B2 * | 8/2006 | Nonaka | 396/61 |
| 7,710,492 B2 * | 5/2010 | Ito | 348/345 |
| 2005/0024508 A1 * | 2/2005 | Okisu et al. | 348/254 |
| 2008/0225158 A1 * | 9/2008 | Ito | 348/349 |
| 2012/0105684 A1 * | 5/2012 | Nozaki et al. | 348/240.3 |

FOREIGN PATENT DOCUMENTS

| JP | 2003116049 A | * | 4/2003 |
|---|---|---|---|
| KR | 1020080000237 A | | 1/2008 |

* cited by examiner

*Primary Examiner* — Anthony J Daniels
(74) *Attorney, Agent, or Firm* — Drinker Biddle & Reath LLP

(57) ABSTRACT

Provided are a digital photographing apparatus capable of accurate and quick auto-focusing, a method of controlling the digital photographing apparatus, and a recording medium storing a program for executing the method. The digital photographing apparatus includes: a lens unit including a focus lens; an imaging device generating data from light incident on the imaging device through the lens unit; a condition determining unit determining a photographing condition from the data generated by the imaging device; and an auto-focusing value detecting unit detecting an auto-focusing value from the data generated by the imaging device and comprising a first gamma correction unit, wherein the first gamma correction unit varies the degree of gamma correction according to the photographing condition determined by the condition determining unit, and the auto-focusing value detecting unit detects an auto-focusing value.

6 Claims, 4 Drawing Sheets

DIGITAL PHOTOGRAPHING APPARATUS, METHOD OF CONTROLLING THE DIGITAL PHOTOGRAPHING APPARATUS, AND RECORDING MEDIUM STORING PROGRAM TO IMPLEMENT THE METHOD

CROSS-REFERENCE TO RELATED PATENT APPLICATION

This application claims the benefit of Korean Patent Application No. 10-2009-0014413, filed on Feb. 20, 2009, in the Korean Intellectual Property Office, the disclosure of which is incorporated herein in its entirety by reference.

BACKGROUND

The present invention relates to a digital photographing apparatus, a method of controlling the same, and a recording medium storing a program to implement the method, and more particularly, to a digital photographing apparatus capable of performing auto-focusing accurately and quickly according to photographing conditions, a method of controlling the same, and a recording medium storing a program to implement the method.

In general, a digital photographing apparatus stores, in a storage medium, image data obtained by a photographing operation in a photographing mode and displays an image from the image data stored in the storage medium on a display unit in a playback mode. Also, the image obtained by the photographing operation in the photographing mode may be immediately displayed in the display unit.

In the photographing mode of the digital photographing apparatus, image data is obtained by photographing a subject while auto-focusing on the subject. However, in conventional digital photographing apparatuses, auto-focusing is performed in the same manner irrespective of photographing conditions. Thus, in a particular photographing condition such as back light, auto-focusing on a subject to be photographed may not be performed quickly and accurately.

SUMMARY

The present invention provides a digital photographing apparatus capable of accurate and quick auto-focusing according to photographing conditions, and a method of controlling the digital photographing apparatus, and a recording medium storing a program for executing the method.

According to an aspect of the present invention, there is provided a digital photographing apparatus comprising: a lens unit including a focus lens; an imaging device that generates data from light incident on the imaging device through the lens unit; a condition determining unit that determines a photographing condition from the data generated by the imaging device; and an auto-focusing value detecting unit that detects an auto-focusing value from the data generated by the imaging device and that comprises a first gamma correction unit, wherein the first gamma correction unit varies a degree of gamma correction according to the photographing condition determined by the condition determining unit, and the auto-focusing value detecting unit detects an auto-focusing value.

The digital photographing apparatus may further comprise: a storage medium that stores a file including the data generated by the imaging device; and a display unit that displays a still image or a motion image from the data generated by the imaging device or the file stored in the storage medium, wherein the display unit displays a preview motion image corresponding to the data generated by the imaging device until a signal is sent by a user, and the preview motion image is gamma-corrected by the first gamma correction unit of the auto-focusing value detecting unit.

The digital photographing apparatus may further comprise a second gamma correction unit, wherein still image data is stored in the storage medium from the data generated by the imaging device according to a signal sent by the user, after gamma-correcting the data generated by the imaging device, by using the second gamma correction unit.

If the condition determining unit determines the condition as a back light condition, the first gamma correction unit may gamma-correct the data generated by the imaging device such that luminance of a region of a subject to be auto-focused on is high.

If the condition determining unit determines the condition as a back light condition, the first gamma correction unit may gamma-correct the data generated by the imaging device such that luminance of a region of a subject to be auto-focused on is the same as a preset luminance or is larger than the preset luminance.

According to another aspect of the present invention, there is provided a method of controlling a digital photographing apparatus, the method comprising: (a) determining a photographing condition; and (b) adjusting a degree of gamma correction for detecting an auto-focusing value according to the photographing condition.

If a back light condition is determined in (a), the degree of gamma correction for detecting an auto-focusing value may be adjusted as a first degree in (b), and if no back light condition is determined in (a), the degree of gamma correction for detecting an auto-focusing value may be adjusted as a second degree in (b).

When the degree of gamma correction for detecting an auto-focusing value is adjusted to be the first degree, a luminance of a region of a subject to be auto-focused on may be higher than when the degree of gamma correction for detecting an auto-focusing value is adjusted to be the second degree.

According to another aspect of the present invention, there is provided a recording medium having embodied thereon a program for executing the above method and variations.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

The present invention will now be described more fully with reference to the accompanying drawings, in which exemplary embodiments of the invention are shown.

Figure 1:
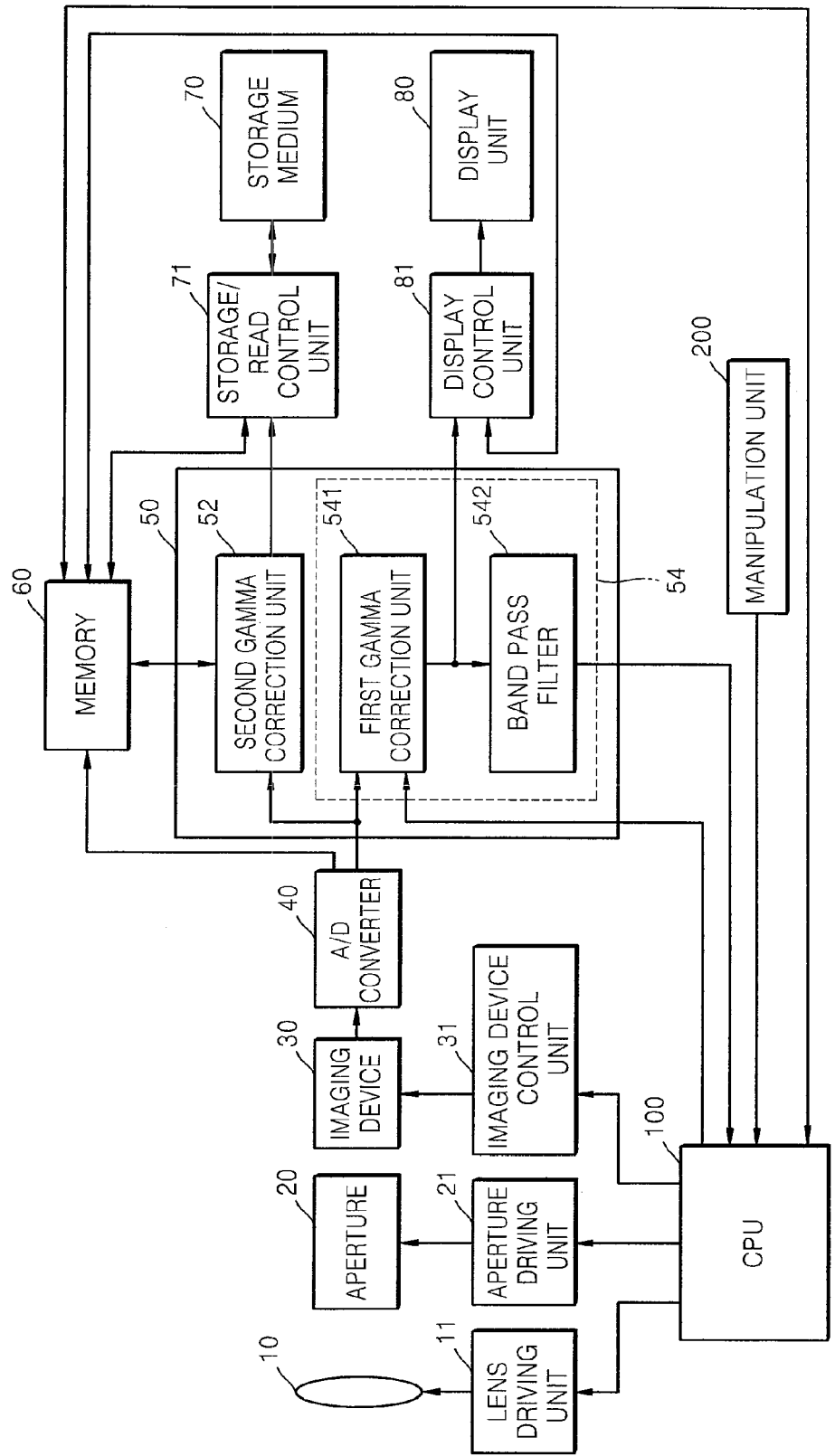
FIG. 1 is a block diagram of a digital photographing apparatus according to an embodiment of the present invention.
Figure 2:
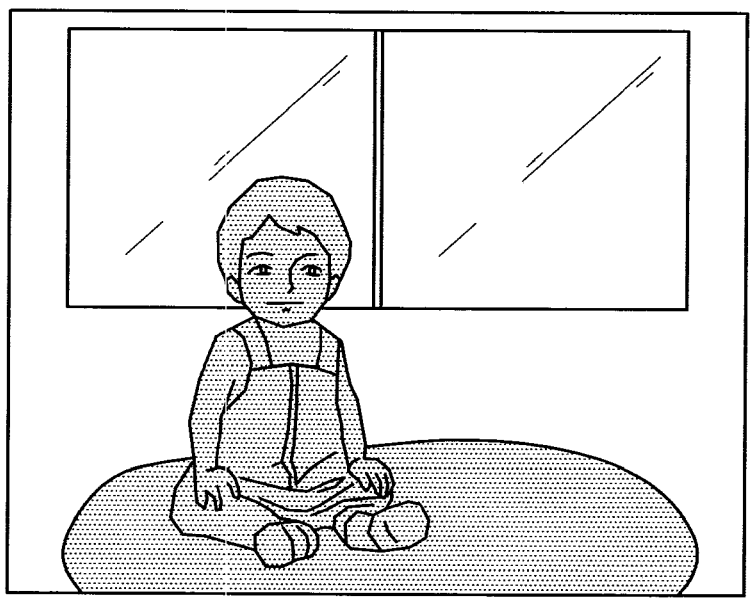
FIGS. 2 and 3 are pictorial illustrations for explaining operations of the digital photographing apparatus of FIG. 1.
Figure 3:

FIG. 1 is a block diagram of a digital photographing apparatus according to an embodiment of the present invention, and FIGS. 2 and 3 are pictorial diagrams for explaining operations of the digital photographing apparatus of FIG. 1.

All operations of the digital photographing apparatus are controlled by a central processing unit (CPU) 100. The digital photographing apparatus includes a manipulation unit 200 including keys for generating an electrical signal according to a user's manipulation. The electrical signal transmitted by the manipulation unit 200 is transmitted to the CPU 100 and then the CPU 100 controls the digital photographing apparatus according to the electrical signal.

In a photographing mode, an electrical signal by the user's manipulation is applied to the CPU 100, and the CPU 100 detects the electrical signal and then controls a lens driving unit 11, an aperture driving unit 21, and an imaging device control unit 31, and accordingly, the position of a lens unit 10 including a focus lens, the aperture size of an aperture 20, and the sensitivity of an imaging device 30 are controlled. The imaging device 30 generates data from light incident on the imaging device 30 through the lens unit 10 including a focus lens, and an analog/digital (A/D) converter 40 converts analog data output by the imaging device 30 into digital data. The digital photographing apparatus may not need the A/D converter 40 according to the characteristics of the image device 30.

Data generated by the imaging device 30 may be input to a digital signal processing unit 50 via a memory 60, or input directly to the digital signal processing unit 50, or, if necessary, to the CPU 100. Examples of the memory 60 include a read only memory (ROM) and a random access memory (RAM). The digital signal processing unit 50 may perform digital signal processing, such as gamma correction or white balance adjustment. Also, as illustrated in FIG. 1, a second gamma correction unit 52 and an auto-focusing value detecting unit 54 may be included. The auto-focusing value detecting unit 54 detects an auto-focusing value from the data generated by the imaging device 30, and includes a first gamma correction unit 541. The auto-focusing value detecting unit 54 may further include a band pass filter 542 as illustrated in FIG. 1. Furthermore, the digital signal processing unit 50 includes a condition determining unit (not shown) that determines a photographing condition from the data generated by the imaging device 30. The condition determining unit may also be a whole element that is not included in the digital signal processing unit 50, or may be a portion of another element not included in the digital signal processing unit 50. The functions of the above elements of the digital photographing apparatus will be described below.

Data output by the digital signal processing unit 50 may be transmitted to a display control unit 81 via the memory 60 or directly thereto. The display control unit 81 controls a display unit 80 to display a still image or a motion image on the display unit 80. The data output by the digital signal processing unit 50 may be input to a storage/read control unit 71 via the memory 60 or directly thereto, and the storage/read control unit 71 may store data into a storage medium 70 according to a signal sent from the user or may store data automatically. The storage/read control unit 71 reads data corresponding to a still image or a motion image from the data stored in the storage medium 70, and inputs the data to the display control unit 81 via the memory 60 or via other path, thereby displaying the still image or the motion image on the display unit 80. The storage medium 70 may be detachable or permanently mounted in the digital photographing apparatus.

The operations of the digital photographing apparatus according to the current embodiment of the present invention will be described in detail with reference to FIGS. 2 and 3. FIGS. 2 and 3 are pictorial diagrams illustrating cases in which a child sitting in front of a window is being photographed indoors. In detail, a photographing condition generally referred to as a "back light condition" occurs when a large amount of light is incident into the room through the window. When a subject (here the child) is photographed under the back light condition, an image (one frame image of a preview motion image) generated by the imaging device 30 as illustrated in FIG. 2 is obtained. When a conventional digital photographing apparatus auto-focuses on the child, which is a main subject, under the above condition, the conventional digital photographing apparatus senses that the child is not in sufficient lighting, and thus quick and accurate auto-focusing cannot be performed. However, in the digital photographing apparatus according to the current embodiment, the condition determining unit (not shown) determines a photographing condition from the data generated by the imaging device 30, and the first gamma correction unit 541 of the auto-focusing value detecting unit 54 varies degrees of gamma correction according to the photographing condition determined by the condition determining unit. Thus the auto-focusing value detecting unit 54 quickly and accurately detects an auto-focusing value.

In detail, in a photographing mode, data is obtained from light incident on the imaging device 30 and images corresponding to the data are displayed on the display unit 80 as a preview motion image in a preview mode, which may be regarded as a real-time motion image. That is, until a signal is sent from a user, the display unit 80 continues to display the preview motion image from the data generated by the imaging device 30. The data on the real-time motion image is generated by the imaging device 30 and is transmitted via the A/D converter 40, the first gamma correction unit 541, and the display control unit 81 to be displayed on the display unit 80.

Under the above condition, when the digital photographing apparatus according to the current embodiment of the present invention auto-focuses on a subject to be photographed, due to a signal sent by the user or automatically, an auto-focusing value which is data for auto-focusing is obtained by the auto-focusing value detecting unit 54 from the data on the preview motion image. Accordingly, when the digital photographing apparatus auto-focuses on the subject to be photographed, according to a signal sent from the user or automatically, the condition determining unit (not shown) determines a photographing condition. For example, if the condition determining unit determines a photographing condition is a back light condition, the first gamma correction unit 541 of the auto-focusing value detecting unit 54 varies the degree of gamma correction such that the subject looks bright as illustrated in FIG. 3, and not like as in FIG. 2, where the subject looks dim when the auto-focusing value detecting unit 54 obtains an auto-focusing value, which is the data for auto-focusing, from the data corresponding to the preview motion image. In other words, it is adjusted such that luminance of a region corresponding to the subject that the digital photographing apparatus auto-focuses on is high. In this case, the first gamma correction unit 541 may gamma-correct the data generated by the imaging device 30 such that the luminance of the region corresponding to the subject to be auto-focused on is the same as a preset luminance or higher than the preset luminance. Methods of determining a back light condition by using the condition determining unit are disclosed, for example, in Korean Patent Laid-Open Gazette No. 2008-0000237, which is included as reference in the present application.

An image (one frame image of the preview motion image) having the subject appearing dim as illustrated in FIG. 2 or an image (one frame image of the preview motion image) having the subject shown brightly by being gamma-corrected by the first gamma correction unit 541 as illustrated in FIG. 3 may be displayed on the display unit 80. If the images are not displayed on the display unit 80, descriptions referring that the subject is dim or bright are used for convenience. In other words, this means that the data generated by the imaging device 30 may be either gamma-corrected or not, and that if the data is gamma-corrected and an image of the gamma-corrected data is to be displayed on the display unit 80, the main subject of the image may look bright.

By adjusting the degree of gamma correction, an image (one frame image of the preview motion image) may be brightened or darkened. Thus, the first gamma correction unit 541 varies the degree of gamma correction according to photographing conditions also when the auto-focusing value detecting unit 54 detects an auto-focusing value for auto-focusing, and accordingly, the auto-focusing value detecting unit 54 may detect an auto-focusing value quickly and accurately. In general, if the subject that is to be auto-focused on looks dark, error may be generated or a long time may be taken in detecting an auto-focusing value.

The auto-focusing value detecting unit 54 may detect an auto-focusing value in various ways; for example, high frequency data within the data generated by the imaging device 30 may be extracted by the band pass filter 542 and then an auto-focusing value may be detected therefrom.

When a still image is photographed according to a signal sent from the user after auto-focusing is performed, data generated by the imaging device 30 is not gamma-corrected by the first gamma correction unit 524 included in the auto-focusing value detection unit 54 but by a second gamma correction unit 52 that is included separately in the digital signal processing unit 50.

Figure 4:
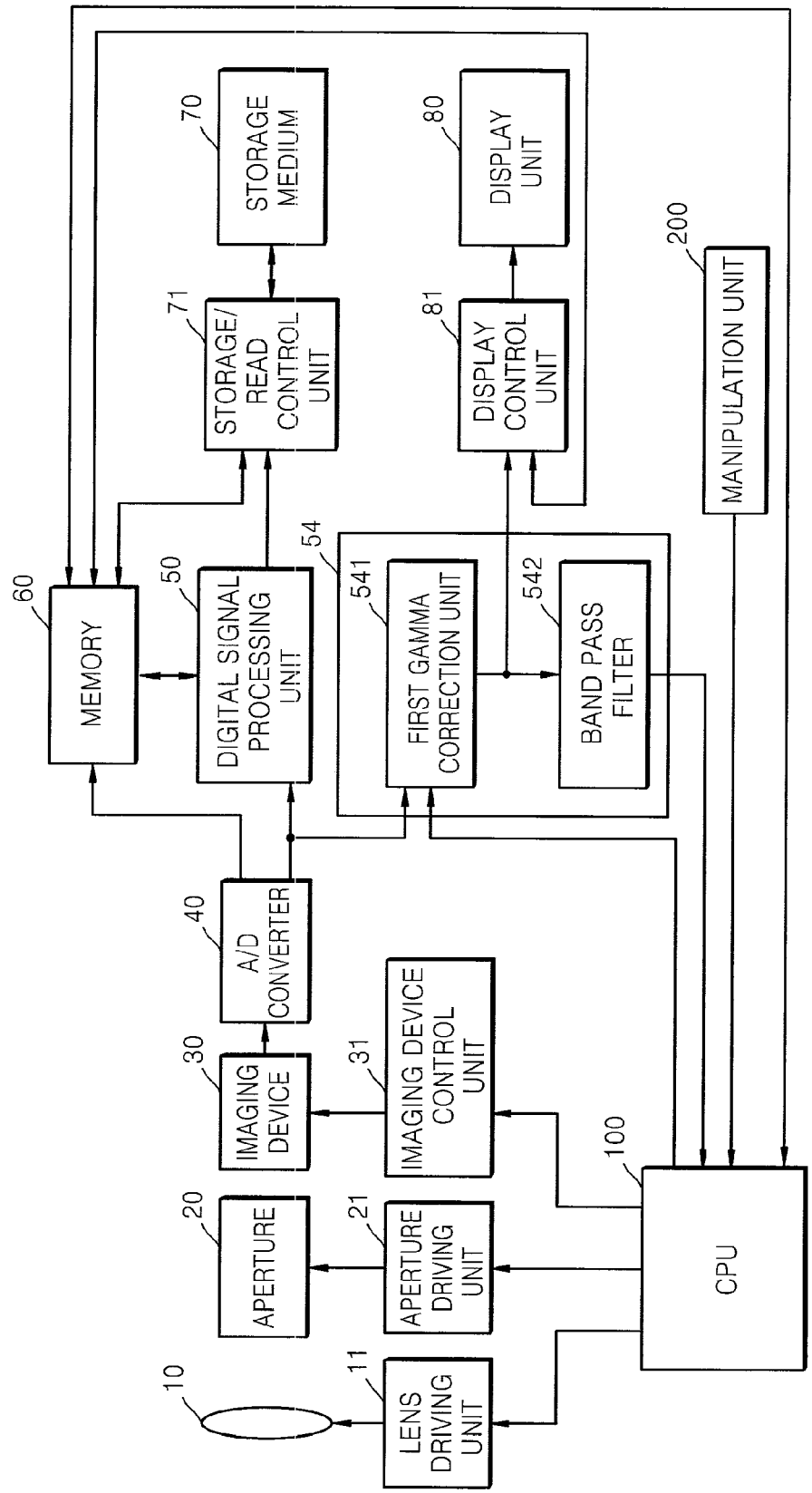
FIG. 4 is a block diagram of a digital photographing apparatus according to another embodiment of the present invention.

FIG. 4 is a block diagram of a digital photographing apparatus according to another embodiment of the present invention. The digital photographing apparatus according to this embodiment is different from the digital photographing apparatus of FIG. 1 in that the auto-focusing value detecting unit 54 is not an element of the digital signal processing unit 50 but is a separate element therefrom. The elements of the digital photographing apparatus according to the present invention may be modified in various manners.

Figure 5:
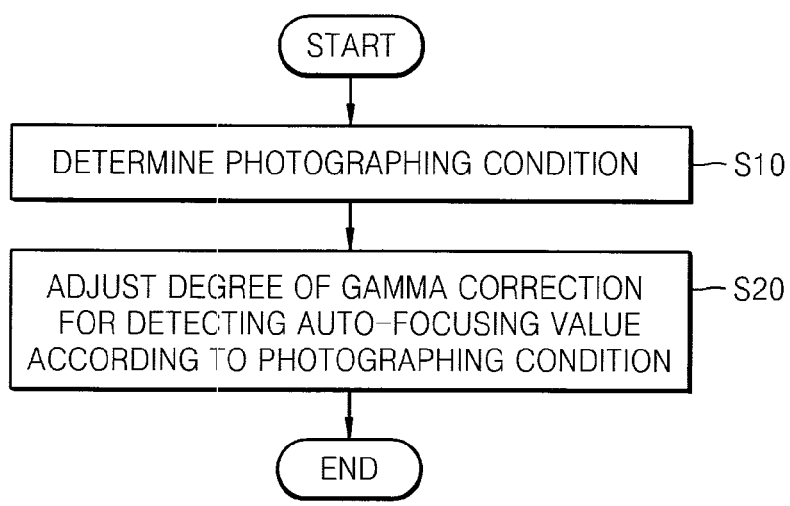
FIG. 5 is a flowchart illustrating a method of controlling a digital photographing apparatus, according to an embodiment of the present invention.
Figure 6:
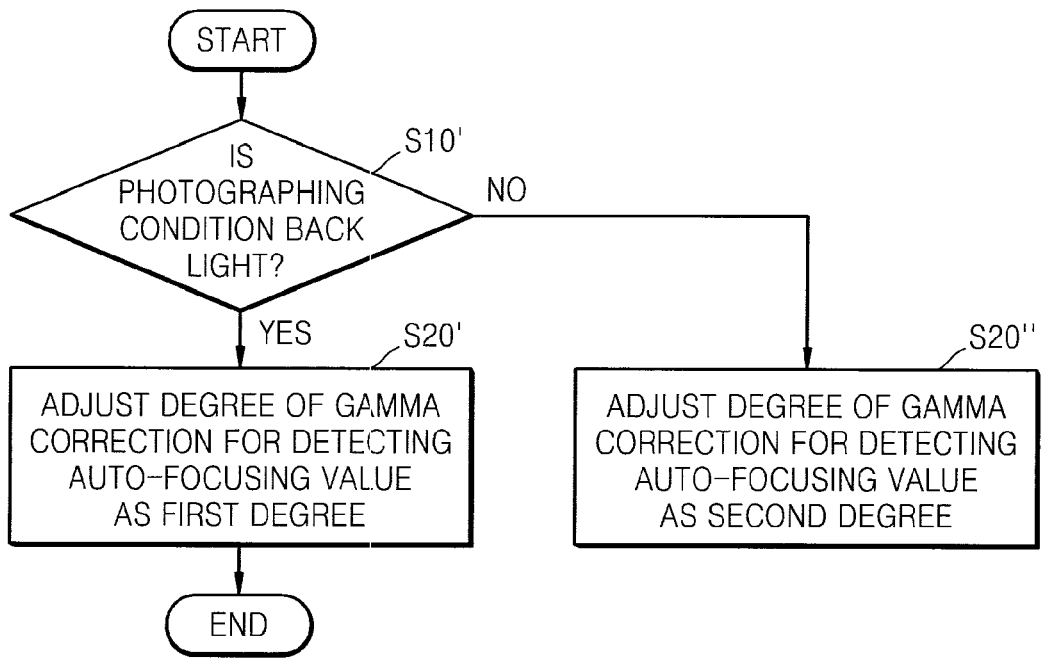
FIG. 6 is a flowchart illustrating a method of controlling a digital photographing apparatus, according to another embodiment of the present invention.

FIG. 5 is a flowchart illustrating a method of controlling a digital photographing apparatus according to an embodiment of the present invention. In operation S10, a photographing condition is determined, and in operation S20, the degree of gamma correction for detecting an auto-focusing value is adjusted according to the photographing condition. Accordingly, an auto-focusing value can be quickly and accurately detected. In particular, as illustrated in FIG. 6, which is a flowchart illustrating a method of controlling a digital photographing apparatus, according to another embodiment of the present invention, whether the current condition is a back light condition or not may be determined when determining a photographing condition. That is, in operation S10', whether it is a back light condition or not is determined. When a back light condition is determined, in operation S20', the degree of gamma correction for detecting an auto-focusing value may be adjusted to be a first degree. When no back light condition is determined, the degree of gamma correction for detecting an auto-focusing value may be adjusted to be a second degree in operation S20". When the degree of gamma correction for detecting an auto-focusing value is adjusted to be the first degree, luminance of a region of a subject to be auto-focused on is higher than that when the degree of gamma correction for detecting an auto-focusing value is adjusted to be the second degree. Accordingly, an auto-focusing value can be quickly and accurately detected.

A program for executing the method of controlling the digital photographing apparatus according to the embodiments and modified examples thereof of the present invention may be stored in a recording medium. The recording medium may be the storage medium 70 or the memory 60 illustrated in FIG. 1, or other separate recording mediums. Examples of the recording mediums include magnetic storage media (e.g., ROM, floppy disks, hard disks, etc.) and optical recording media (e.g., CD-ROMs, or digital versatile discs (DVDs)). The various functional aspects described above may be implemented as software algorithms or modules containing instructions executable on a processor.

As described above, according to the digital photographing apparatus, the method of controlling the digital photographing apparatus, and the recording medium storing a program for executing the method according to the embodiments of the present invention, accurate and quick auto-focusing can be performed according to the photographing conditions.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the present invention.

What is claimed is:

1. A digital photographing apparatus comprising:
    a lens;
    an imaging device that generates data from light incident on the imaging device through the lens;
    a condition determining unit that determines a photographing condition from the data generated by the imaging device; and
    an auto-focusing value detecting unit that detects an auto-focusing value from the data generated by the imaging device and that comprises a first gamma correction unit,
    wherein after the first gamma correction unit varies a degree of gamma correction according to the photographing condition determined by the condition determining unit, the auto-focusing value detecting unit detects an auto-focusing value for the varied degree of gamma correction,
    wherein if the condition determining unit determines the condition as a back light condition, the first gamma correction unit gamma-corrects the data generated by the imaging device such that luminance of a region of a subject to be auto-focused on is high.

2. The digital photographing apparatus of claim 1, further comprising:
    a storage medium that stores a file including the data generated by the imaging device; and
    a display unit that displays a still image or a motion image from the data generated by the imaging device or the file stored in the storage medium,
    wherein the display unit displays a preview motion image corresponding to the data generated by the imaging device until a signal is sent by a user, and the preview motion image is gamma-corrected by the first gamma correction unit of the auto-focusing value detecting unit.

3. The digital photographing apparatus of claim 2, further comprising a second gamma correction unit,
    wherein still image data is stored in the storage medium from the data generated by the imaging device according to a signal sent by the user, after gamma-correcting the data generated by the imaging device, by using the second gamma correction unit.

4. The digital photographing apparatus of claim 1, wherein if the condition determining unit determines the condition as a back light condition, the first gamma correction unit gamma-corrects the data generated by the imaging device such that luminance of a region of a subject to be auto-focused on is the same as a preset luminance or is larger than the preset luminance.

5. A method of controlling a digital photographing apparatus, the method comprising:
    (a) determining a photographing condition; and
    (b) adjusting a degree of gamma correction for detecting an auto-focusing value according to the photographing condition,
    wherein if a back light condition is determined in (a), the degree of gamma correction for detecting an auto-focusing value is adjusted as a first degree in (b), and if no back light condition is determined in (a), the degree of gamma correction for detecting an auto-focusing value is adjusted as a second degree in (b),
    wherein when the degree of gamma correction for detecting an auto-focusing value is adjusted to be the first degree, a luminance of a region of a subject to be auto-focused on is higher than when the degree of gamma correction for detecting an auto-focusing value is adjusted to be the second degree.

6. A non-transitory computer program product, comprising a computer usable medium having a computer readable program code embodied therein, said computer readable program code adapted to be executed to implement a method for controlling a digital photographing apparatus, said method comprising:
    (a) determining a photographing condition; and
    (b) adjusting a degree of gamma correction for detecting an auto-focusing value according to the photographing condition,
    wherein the method further comprises if a back light condition is determined in (a), the degree of gamma correction for detecting an auto-focusing value is adjusted as a first degree in (b), and if no back light condition is determined in (a), the degree of gamma correction for detecting an auto-focusing value is adjusted as a second degree in (b),
    wherein the method further comprises, when the degree of gamma correction for detecting an auto-focusing value is adjusted to be the first degree, a luminance of a region of a subject to be auto-focused on is higher than when the degree of gamma correction for detecting an auto-focusing value is adjusted to be the second degree.

* * * * *